(12) United States Patent
Burger et al.

(10) Patent No.: US 7,105,581 B2
(45) Date of Patent: Sep. 12, 2006

(54) ANTIFOAM FORMULATIONS

(75) Inventors: Willibald Burger, Burghausen (DE);
Holger Rautschek, Nuenchritz (DE);
Christian Herzig, Waging (DE)

(73) Assignee: Wacker-Chemie GmbH, Munich (DE)

( * ) Notice: Subject to any disclaimer, the term of this patent is extended or adjusted under 35 U.S.C. 154(b) by 334 days.

(21) Appl. No.: 10/703,940

(22) Filed: Nov. 7, 2003

(65) Prior Publication Data
US 2004/0106749 A1 Jun. 3, 2004

(30) Foreign Application Priority Data
Nov. 28, 2002 (DE) ............................... 102 55 649

(51) Int. Cl.
*B01D 19/04* (2006.01)
*C08G 77/18* (2006.01)
*C08L 83/12* (2006.01)

(52) U.S. Cl. ..................... 516/124; 524/265; 525/100; 528/10; 556/443; 556/444

(58) Field of Classification Search ................. 516/124
See application file for complete search history.

(56) References Cited

U.S. PATENT DOCUMENTS

| | | | |
|---|---|---|---|
| 5,523,019 A | 6/1996 | Kim | |
| 5,625,024 A | 4/1997 | Schlitte et al. | |
| 6,187,891 B1 * | 2/2001 | Rautschek et al. | ............ 528/25 |
| 6,605,183 B1 * | 8/2003 | Rautschek et al. | ............ 162/72 |
| 2003/0013808 A1 | 1/2003 | Tonge et al. | |

FOREIGN PATENT DOCUMENTS

| | | |
|---|---|---|
| DE | 56 762 | 8/1967 |
| DE | 29 25 722 | 2/1981 |
| EP | 0 341 952 | 11/1989 |
| EP | 0 663 225 | 7/1995 |
| EP | 0 663 225 A1 | 7/1995 |
| EP | 1 076 073 | 6/2000 |
| EP | 1 076 073 A1 | 2/2001 |
| WO | WO 98/00216 | 1/1998 |

OTHER PUBLICATIONS

English Derwent Abstract AN 2001-124111 corresponding German Patent DE 199 18 361.*
English Derwent Abstract AN 1981-09925D [7] corresp. to DE 29 25 722.
English Derwent Abstract AN-2001-259426 [27] corresp. to EP 1 076 073.
English Derwent Abstract corresp. to DE 56 762.

* cited by examiner

*Primary Examiner*—Randy Gulakowski
*Assistant Examiner*—Timothy J. Kugel
(74) *Attorney, Agent, or Firm*—Brooks Kushman P.C.

(57) ABSTRACT

An antifoam formulations comprise
(A) antifoam agent based on siloxanes and
(B) branched polyether/polysiloxane copolymers comprising structural units of the formula $$Y[-C_nH_{2n}-(R_2SiO)_m-A_p-R_2Si-G]_x \quad (I)$$

in which Y is a multivalent, optionally heteroatom-containing hydrocarbon radical, R are monovalent optionally halogenated hydrocarbon radicals, A is a radical $-R_2Si-R^2-(R_2SiO)m-$, G is a monovalent radical $-C_fH_{2f-2k}-Z$ or a divalent radical $-C_nH_{2n}-$ bonded to a radical Y, Z $-(R^6)_v-(OCH_2CH_2)_a[OCH_2CH(CH_3)]_b[OCH_2CH(CH_2CH_3)]_c-OR^3$, in which $R^3$ is hydrogen, a hydrocarbon radical, or a radical $R-C(O)-$, $R^6$ is a divalent hydrocarbon radical, v is 0 or 1, a, b and c are 0 or an integer between 1 and 1000, the sum (a+b+c) being from 2 to 2000, x is 3 to 10, f is 2 to 12, k is 0 or 1, n is 2 to 12, m is at least 1, and p is 0 or a positive integer, the branched polyether/polysiloxane copolymers (B) containing on average at least one group Z.

14 Claims, No Drawings

ANTIFOAM FORMULATIONS

BACKGROUND OF THE INVENTION

1. Field of the Invention

The invention relates to antifoam formulations comprising (A) antifoam agents based on siloxanes and (B) branched polyether/polysiloxane copolymers, and the use thereof for the defoaming of aqueous media, in particular media obtained in pulp production.

2. Background Art

In many liquids which contain surface-active compounds as desired or undesired components, particularly aqueous systems, problems may arise due to foam formation if these systems are brought into more or less intensive contact with gaseous substances, for example during the gassing of wastewaters, during the intensive stirring of liquids, in distillation, scrubbing or dyeing processes or in filling processes. This foam can be controlled by a mechanical method or by the addition of antifoams. Siloxane-based antifoams have proven particularly useful.

Antifoams based on siloxanes are prepared, for example according to DD-A 056 762, by heating hydrophilic silica in polydimethylsiloxanes. The process is very complicated, but the efficiency of the antifoams thus prepared is still not satisfactory. The distribution of hydrophobic silica in a polydimethylsiloxane, for example according to DE-A 29 25 722, is a more rational process, but the efficiency of the antifoams obtained is likewise worthy of improvement.

The use of modified polyorganosiloxanes in antifoam preparations is also known. Thus, for example, the use of branched polysiloxane antifoams in combination with polyether/polysiloxane copolymers as antifoams is recommended for pulp production (EP-A 341 952). Polyether/polysiloxane copolymers are said to have a positive effect also in combination with mineral oils as a carrier oil (U.S. Pat. No. 5,523,019). According to WO 98/000216, siloxanes having dimethyl-3-hydroxypropylpolyoxyethylene-polyoxypropylene groups are said to be particularly suitable as surfactants in antifoam formulations.

EP-A 663 225 and EP-A 1076073 describe, respectively, crosslinked and branched polyorganosiloxanes which carry at least one polyether group, as one of the two components of an antifoam formulation. The crosslinking is effected via alkylene groups, via polydimethylsiloxanes or via polyether groups. As a result of the linkage via Si—C bonds, the products are stable to hydrolysis. In contrast, the process proposed in U.S. Pat. No. 5,625,024 leads to linkages via Si—O—C groups, which are not stable to hydrolysis, particularly in acidic or basic media, and thus such compositions rapidly lose their efficiency in a foaming aqueous medium.

In addition to the drawbacks discussed above, the antifoam formulations prepared according to the prior art do not always have sufficient efficiency.

SUMMARY OF THE INVENTION

It was therefore an object of the invention to propose antifoam formulations which are based on siloxanes and have improved efficiency, particularly in strongly foaming, hot, alkaline media, which are obtained, for example, in pulp production. These and other objects are met by antifoam compositions based on siloxanes and specific, branched polyether/polysiloxane copolymers.

DETAILED DESCRIPTION OF THE PREFERRED EMBODIMENT(S)

The invention relates to antifoam formulations comprising (A) antifoam based on siloxanes and (B) branched polyether/polysiloxane copolymers comprising structural elements of the formula $$Y[-C_nH_{2n}-(R_2SiO)_m-A_p-R_2Si-G]_x \quad (I)$$

in which

Y is a trivalent to decavalent, preferably trivalent or tetravalent, hydrocarbon radical which may contain one or more hetero atoms selected from the group consisting of oxygen, nitrogen and silicon atoms, R are identical or different monovalent, optionally halogenated hydrocarbon radicals having 1 to 18 carbon atoms per radical, A is a radical of the formula $-R_2Si-R^2-(R_2SiO)_m-$, in which $R^2$ is a divalent hydrocarbon radical which has 2 to 30 carbon atoms and may be interrupted by one or more non-adjacent oxygen atoms, preferably from 1 to 4 non-adjacent oxygen atoms, G is a monovalent radical of the formula $-C_fH_{2f-2k}-Z$ or a divalent radical of the formula $-C_nH_{2n}-$ in which the second bond is to a further radical Y, Z is a radical of the formula $$-(R^6)_v-(OCH_2CH_2)_a[OCH_2CH(CH_3)]_b[OCH_2CH(CH_2CH_3)]_c-OR^3,$$

in which $R^3$ is a hydrogen atom or a hydrocarbon radical having 1 to 18 carbon atoms or a radical of the formula R—C(O)— (in which R has the meaning stated above therefor), $R^6$ is a divalent hydrocarbon radical having 1 to 10 carbon atoms and v is 0 or 1, preferably 1, and a, b and c are 0 or an integer between 1 and 1000, c preferably being 0, with the proviso that the sum (a+b+c) has a value of from 2 to 2000, preferably from 2 to 200, and more preferably from 2 to 150, x is an integer from 3 to 10, preferably 3 or 4, f is an integer from 2 to 12, preferably 2, k is 0 or 1, preferably 0, n is an integer from 2 to 12, preferably 2, m is an integer of at least 1, preferably an integer from 1 to 1000, and p is 0 or a positive integer, preferably 0 or an integer from 1 to 20, with the proviso that the branched polyether/polysiloxane copolymers contain on average at least one group Z.

The polyether/polysiloxane copolymer (B) according to the invention which is used is of decisive importance for the efficiency of the antifoam formulation according to the invention.

The antifoam formulations preferably contain from 0.1 to 75% by weight, more preferably from 0.1 to 50% by weight, and most preferably from 3 to 50% by weight, of the polyether/polysiloxane copolymers (B) according to the invention.

The preparation of the branched polyether/polysiloxane copolymers (B) of the general formula (I) is preferably effected by a procedure in which, in a first step, compounds (1) having at least three aliphatic double bonds, of the formula $$Y(CR^1=CH_2)_x$$

in which Y and x have the meaning stated above therefor and $R^1$ is a hydrogen atom or an alkyl radical having 1 to 10 carbon atoms, are reacted with organopolysiloxanes (2) of the general formula

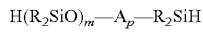
$H(R_2SiO)_m—A_p—R_2SiH$ in which A, R, m and p have the meanings stated above therefor, in the presence of catalysts (3) promoting the addition of Si-bound hydrogen at an aliphatic multiple bond ("hydrosilylation catalysts") and, in a second step, the branched intermediates (5) thus obtained and still having Si-bound hydrogen atoms, are reacted with organic compounds (4) of the formula

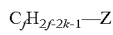
$C_fH_{2f-2k-1}—Z$ selected from the group consisting of
if k=0: $H_2C=CR^4—Z$ (4a) and
if k=1: $R^5WC≡C—Z$ (4b)

in which $R^4$ and $R^5$ have the meaning of $R^1$, f, k and Z have the abovementioned meaning, this reaction also taking place in the presence of catalysts (3) promoting the addition of Si-bound hydrogen at an aliphatic multiple bond. In the above process, k is preferably 0 and organic compounds (4a) are therefore preferred.

The polyether/polysiloxane copolymers (B) contained in the antifoam formulations having a branched structure contain in principle chain-like siloxane blocks whose ends are each linked via a $C_fH_{2f}$ or $C_fH_{2f-2}$ bridge to the structural elements Y or Z. The more siloxane blocks which are linked on both sides to elements Y, the greater the degree of branching of the products produced. In general, the polyether/polysiloxane copolymers according to the invention have a composition such that siloxane blocks and organic blocks alternate with one another, the branching structures and the ends consisting of organic blocks. In the polyether/polysiloxane copolymers, the ratio of terminal groups Z to branching groups Y (Z/Y ratio) is preferably from 1.0 to 2.0, preferably from 1.1 to 1.5.

The polyether/polysiloxane copolymers (B) according to the invention preferably have a viscosity of from 50 to 50,000,000 mPa·s at 25° C., preferably from 500 to 5,000,000 mPa·s at 25° C. and most preferably from 1000 to 1,000,000 mPa·s at 25° C.

Examples of radicals R include alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals, such as the n-heptyl radical, octyl radicals such as the n-octyl radical, and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as the o-, m- and p-tolyl radicals, xylyl radicals and ethylphenyl radicals; and aralkyl radicals such as the benzyl radical and the α- and the β-phenylethyl radicals.

Examples of halogenated radicals R include haloalkyl radicals, such as the 3,3,3-trifluoro-n-propyl radical, the 2,2,2,2',2',2'-hexafluoroisopropyl radical, and the heptafluoroisopropyl radical, and haloaryl radicals such as the o-, m- and p-chlorophenyl radicals.

The radical R is preferably a monovalent hydrocarbon radical having 1 to 6 carbon atoms, the methyl radical being particularly preferred.

Examples of alkyl radicals $R^1$ include the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radical, nonyl radicals such as the n-nonyl radical, and decyl radicals such as the n-decyl radical. $R^1$ is preferably a hydrogen atom.

Examples of radicals $R^2$ are those of the formula

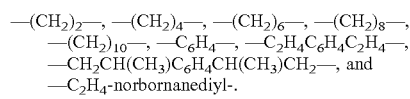
—$(CH_2)_2$—, —$(CH_2)_4$—, —$(CH_2)_6$—, —$(CH_2)_8$—,
—$(CH_2)_{10}$—, —$C_6H_4$—, —$C_2H_4C_6H_4C_2H_4$—,
—$CH_2CH(CH_3)C_6H_4CH(CH_3)CH_2$—, and
—$C_2H_4$-norbornanediyl-.

Examples of hydrocarbon radicals $R^3$ include alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radical, nonyl radicals such as the n-nonyl radical, decyl radicals such as the n-decyl radical, and dodecyl radicals such as the n-dodecyl radical; aryl radicals such as the phenyl radical; and aralkyl radicals such as the benzyl radical and the α- and the β-phenylethyl radicals.

An example of a radical of the formula R—C(O)— is the acetyl radical.

$R^3$ is preferably a hydrogen atom or a methyl, an n-butyl or an acetyl radical.

Examples of radicals $R^1$ are all applicable to the radicals $R^4$ and $R^5$. $R^4$ is preferably a hydrogen atom, and $R^5$ is preferably a hydrogen atom.

Examples of radicals $R^6$ include those of the formula —$(CH_2)$—, —$(CH_2)_2$—, —$(CH_2)_4$—, —$C(CH_3)_2$—, the radical —$(CH_2)$— being preferred.

As the skilled artisan is aware, in the first process step, the addition of the SiH group of (2) at the $CH_2=CR^1$ group of (1), a so-called hydrosilylation reaction, leads to the formation of two isomers, as follows:

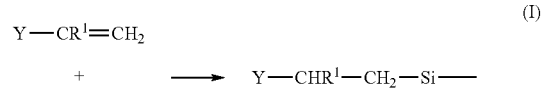
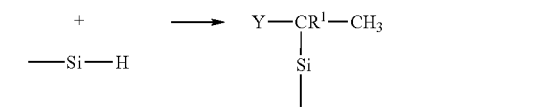

The —$C_nH_{2n}$ group in the organosiloxane (co)polymers (I) according to the invention takes into account this isomer formation and therefore preferably comprises the isomeric radicals —$CHR^1$—$CH_2$— of (i) and —$CR^1$—$CH_3$ of (ii) and n is therefore the total number of C atoms in the $CH^2=CR^1$ group of (1). Since $R^1$ is preferably a hydrogen atom, n is preferably 2.

In the process according to the invention, one type of compound (1) or different types of compound (1) may be used.

Examples of compounds (1) with which the branched polyether/polysiloxane copolymers (B) according to the invention can be prepared are 1,2,4-trivinylcyclohexane, 1,3,5-trivinylcyclohexane, 3,5-dimethyl-4-vinyl-1,6-heptadiene, 1,2,3,4-tetravinylcyclobutane, methyltrivinylsilane, tetravinylsilane, 1,1,2,2-tetraallyloxyethane, 1,2,4-trivinylcyclohexane being preferred.

Examples of the radical Y are therefore those of the formula

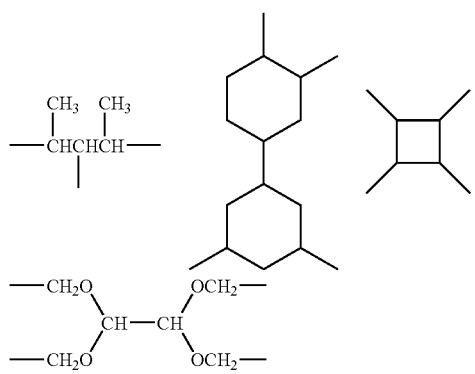

the radical of the formula

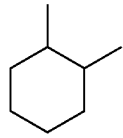

being preferred.

In the inventive process, one type of organopolysiloxane (2) or different types of organopolysiloxane (2) may be used. A substantially linear polymer is used as organopolysiloxane (2), where p is preferably 0, and m is preferably an integer from 5 to 400.

Organopolysiloxane (2) is used in the first process step in amounts such that the ratio of Si-bound hydrogen in organopolysiloxane (2) to aliphatic double bond in compound (1) is preferably at least 1.5, more preferably from 1.5 to 20, and most preferably from 1.5 to 5.0.

Since organopolysiloxane (2) is used in excess, all aliphatic double bonds in the compound (1) therefore react in the first process step, and branched intermediates (5) which have Si-bound hydrogen atoms are obtained. In the case of low molecular weight organopolysiloxanes (2) in which p=0 and m=1–6, intermediates (5) virtually free of organopolysiloxane (2) can be obtained by the subsequent distillative removal of the excess organopolysiloxane (2). In the other cases, excess organopolysiloxane (2) is preferably left in the reaction mixture, with the result that the intermediates (5) are diluted. In order to obtain soluble, i.e. uncrosslinked, intermediates (5), a molar ratio of SiH in (2) to C=C in (1) of at least 1.5 is therefore preferably used. The required molar ratio depends on the respective structure of (1) and on the index x and can be determined experimentally by a person skilled in the art in the individual case by small-scale tests.

Any hydrosilylation catalyst which promotes the addition of Si-bound hydrogen at an aliphatic multiple bond can be used in the novel process as the catalysts (3). The catalysts are preferably a metal from the platinum group metals or a compound or a complex from the platinum group metals. Examples of such catalysts are metallic and finely divided platinum which may be present on supports, such as silica, alumina or active carbon, compounds or complexes of platinum, such as platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without a content of detectable inorganically bonded halogen, bis(gamma-picoline)platinum dichloride, tetramethylenedipyridineplatinum dichloride, dicyclopentadieneplatinum dichloride, dimethylsulfoxyethyleneplatinum (II) dichloride, cyclooctadieneplatinum dichloride, norbornadieneplatinum dichloride, gamma-picolineplatinum dichloride, cyclopentadieneplatinum dichloride and reaction products of platinum tetrachloride with olefin and primary amine or secondary amine or primary and secondary amine, such as the reaction product of platinum tetrachloride dissolved in 1-octene with sec-butylamine or ammonium-platinum complexes.

In the first process step, the catalyst (3) is preferably used in amounts of from 0.2 to 20 ppm by weight (parts by weight per million parts by weight), preferably in amounts of from 1 to 10 ppm by weight, calculated in each case as elemental platinum and based on the total weight of compound (1) and organopolysiloxane (2).

The first process step is preferably carried out at the pressure of the ambient atmosphere, i.e. at about 1020 hPa (abs.), but it can also be carried out at higher or lower pressures. Furthermore, the first process step is preferably carried out at a temperature of from 20° C. to 150° C., especially from 40° C. to 100° C.

Since the compound (1) having at least three aliphatic double bonds, e.g. 1,2,4-trivinylcyclohexane, tends to polymerize at relatively high temperatures, free radical inhibitors, such as 4-methoxyphenol, 2,6-bis(tert-butyl)-4-methylphenol, phenothiazine, hydroquinone or pyrocatechol, can preferably be used concomitantly in the first process step. The free radical inhibitors are preferably used in an amount of from 10 to 500 ppm by weight, based on the total weight of the compound (1) and organopolysiloxane (2).

In the first as well as in the second process step, organic solvents, preferably inert organic solvents, can be used concomitantly. Examples of inert organic solvents are toluene, xylene, octane isomers, heptane isomers, butyl acetate, 1,2-dimethoxyethane, tetrahydrofuran and cyclohexane. The optional concomitantly used inert organic solvents can be removed by distillation after the first or second process step or can remain in the reaction mixture.

The organic compounds (4) contain aliphatic C—C double or triple bonds which are reactive toward Si—H groups in hydrosilylation reactions and undergo an addition reaction with them, with the formation of Si—C bonds. If k=0, the reactive group contains a double bond and the organic compound (4) is a compound (4a) of the formula $H_2C=CR^3—Z$, which is preferred. If k=1, the reactive group contains a triple bond and the organic compound (4) is a compound (4b) of the formula $R^4C\equiv C-Z$.

As one skilled in the art is aware, in the addition of the Si—H group in the intermediate (5) at the double or triple bond in (4a) or (4b), the formation of isomers takes place, as follows:

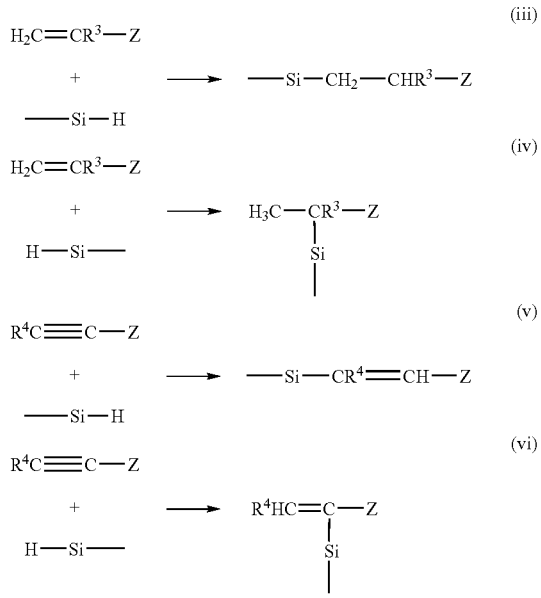

The $-C_fH_{2f-2k}-$ group in formula (I) of the polyether/polysiloxane copolymers (B) take into account this isomer formation and are therefore preferably the isomeric radicals:
$-CH_2-CHR^3-$ of (iii) and $H_3C-CR^3-$ of (iv); and
$-CR^4=CH-$ of (v) and $R^4HC=C-$ of (vi)

Since the organic compounds (4a) are preferred, the isomeric radicals (iii) and (iv) are preferred), and f is therefore the total number of C atoms in the $H_2C=CR^3$ group of (4a) or the $R^4C\equiv C$ group of (4b). Since $R^3$ and $R^4$ are preferably hydrogen atoms, f is therefore preferably 2.

Examples of the $H_2C=CR^3$ group in the organic compound (4) are $H_2C=CH-$, $H_2C=C(CH_3)-$, $H_2C=C(C_4H_9)-$, and $H_2C=C(C_8H_{17})-$, while examples of the $R^4C\equiv C$ group in the organic compound (4b) are $HC\equiv C-$, $CH_3C\equiv C-$, and $C_4H_9C\equiv C-$.

A preferred example of the organic compound (4a) is the compound of the formula

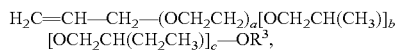

and the isomeric radicals of the formulae

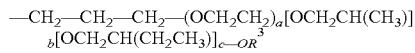

and

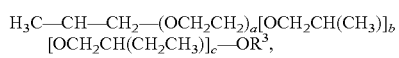

in which a, b, c and $R^3$ have the meaning stated above, are therefore preferred for the radical $-C_fH_{2f-2k}-Z$ in (I).

The radical Z bonded to the double or triple bond in (4a) or (4b) is a polyether. Usually, the polyethers are prepared by polymerization of an alkylene oxide such as ethylene oxide, propylene oxide, and/or butylene oxide, it being possible for the oxyalkylene units to be present either in random distribution or as block copolymers. The polyethers can be prepared from only one alkylene oxide or by copolymerization from two or more alkylene oxides. Depending on the process, random copolymers or block copolymer are obtained, random polyethers being preferred. The polyethers of the formulae 4a and 4b which are used for the preparation of the branched polyether/polysiloxane copolymers contained in the antifoam formulations have at least two polyoxyalkylene units, usually not more than 200 polyoxyalkylene units, and preferably not more than 150 polyoxyalkylene units.

In the second process step, the organic compound (4) is used in amounts such that the ratio of aliphatic double bonds in (4a) or aliphatic triple bonds in (4b) to Si-bound hydrogen in the intermediate (5) obtained in the first process step is preferably from 1.05 to 1.5.

When carrying out the second process step, it is possible to meter compound (4) into the catalyzed intermediate (5), or vice versa. Preferably, however, the compound (4) is initially introduced with catalyst (3), after which the intermediate (5) is metered. If the heat of reaction of this hydrosilylation reaction tends to be small, a mixture of (4) and (5) is advantageously initiated at suitable temperature with catalyst (3), in an adiabatic procedure the increase in temperature of the reaction mixture being a measure of the progress of the reaction itself.

If the compound (4) is volatile, the excess compound (4) can be removed by distillation, otherwise, it may remain in the end product.

In the second process step, the catalyst (3) is preferably used in amounts of from 0.5 to 50 ppm by weight (parts by weight per million parts by weight), preferably in amounts of from 2 to 20 ppm by weight, calculated in each case as elemental platinum and based on the total weight of the organic compound (4) and intermediate (5) obtained in the first process step.

The second process step is preferably carried out at the pressure of the ambient atmosphere, i.e. at about 1020 hPa (abs.), but it can also be carried out at higher or lower pressures. Furthermore, the first process step is preferably carried out at a temperature of from 20° C. to 150° C., especially from 40° C. to 120° C.

The branched polyether/polysiloxane copolymer (B) according to the invention has an antifoam action. It is thus possible to use the polyether/polysiloxane copolymer (B) alone as an antifoam, or in conjunction with other ingredients as well.

The antifoam formulations according to the invention preferably comprise:
(A) from 1 to 90% by weight of antifoam agent based on siloxanes,
(B) from 0.1 to 50% by weight of the branched polyether/polysiloxane copolymer of the general formula (I),
(C) from 0 to 20% by weight, preferably from 2 to 20% by weight, of emulsifiers,
(D) from 0 to 97% by weight of water, all weight percentages based on the total weight of the antifoam formulations, and optionally
(E) preservatives, thickeners and further additives.

An antifoam agent based on siloxanes (also referred to below as siloxane antifoam) which is usually used as a mixture of silica and polyorganosiloxanes, preferably comprises
(aa) from 1 to 15% by weight of a precipitated and/or pyrogenic silica rendered hydrophobic in situ and having a BET surface area greater than 50 g/m² and/or a pretreated, hydrophobic, precipitated and/or pyrogenic silica having a BET surface area greater than 50 g/m², (ab) from 20 to 99% by weight of one or more polyorganosiloxanes comprising units of the general formula

$$R^7_e(R^8O)_d SiO_{(4-e-d)/2} \quad (II)$$

in which each $R^7$ are identical or different and are monovalent, substituted and/or unsubstituted saturated and/or unsaturated hydrocarbon radicals having 1 to 30 carbon atoms per radical, $R^8$ are identical or different and are a hydrogen atom or a monovalent, substituted and/or unsubstituted saturated and/or unsaturated hydrocarbon radical having from 1 to 30 carbon atoms per radical, d is 0, 1, 2 or 3, d having on average a value of less than 0.5, e is 0, 1, 2 or 3, with the proviso that the sum (d+e) is <3 and has on average a value of from 1.8 to 2.4, (ac) from 0 to 10% by weight of silicone resin which substantially comprises units of the general formula $R_3SiO_{1/2}$ and $SiO_{4/2}$, in which R has the meaning stated above therefor, and (ad) from 0 to 80% by weight of an organic compound having a boiling point greater than 100° C., selected from mineral oils, natural oils, isoparaffins, polyisobutylenes, residues from the oxo alcohol synthesis, esters of low molecular weight synthetic carboxylic acids, ethers of low molecular weight alcohols, phthalates and esters of phosphoric acid, the percentages by weight being based in each case on the total weight of the siloxane antifoam agent.

The imparting of hydrophobic properties in situ to the silica (aa) can be effected by heating the silica dispersed in the polyorganosiloxane (ab) to temperatures of from 100 to 200° C. for several hours. The reaction can be promoted by the addition of catalysts, such as KOH, and of water repellents, such as short-chain OH-terminated polydimethylsiloxanes, silanes, silazanes or silicone resins. As an alternative, it is possible to use pretreated silicas which have been rendered hydrophobic, or a combination of silicas rendered hydrophobic in situ with pretreated silicas rendered hydrophobic.

Examples of radicals $R^7$ in the general formula (II) are unsubstituted, branched or straight-chain alkyl radicals such as methyl, ethyl, propyl, isopropyl, hexyl, 2-ethylhexyl, octyl or dodecyl radical; substituted alkyl radicals such as trifluoropropyl, cyanoethyl, glycidyloxypropyl, polyalkyleneglycolpropyl, aminopropyl or aminoethylaminopropyl radicals; unsaturated radicals such as vinyl, methacryloyloxypropyl or allyl radicals; or aromatic radicals such as phenyl, tolyl, xylyl, naphthyl, anthracyl or benzyl radicals. Particularly preferred radicals $R^7$ are the methyl and phenyl radicals, it being particularly preferred that more than 80 mol % of the radicals $R^7$ are methyl radicals.

Examples of radicals $R^8$ in the general formula (II) are unsubstituted, branched or straight-chain alkyl radicals such as methyl, ethyl, propyl, isopropyl, hexyl, 2-ethylhexyl, octyl or dodecyl radicals; substituted alkyl radicals such as trifluoropropyl, cyanoethyl, glycidyloxypropyl, polyalkyleneglycolpropyl, aminopropyl or aminoethylaminopropyl radicals; unsaturated radicals such as vinyl, methacryloyloxypropyl or allyl radicals; or aromatic radicals such as phenyl, tolyl, xylyl, naphthyl, anthracyl or benzyl radicals.

Examples of compounds of the formula (II) are polydimethylsiloxanes having viscosities from 100 to 1,000,000 mPa·s at 25° C. These polydimethylsiloxanes may be branched, for example by the incorporation of $CH_3SiO_{3/2}$ or $SiO_{4/2}$ units. These branched or partly crosslinked siloxanes then have viscoelastic properties.

Such branched viscoelastic polyorganosiloxanes can be obtained, for example, by reacting the dimethyldichlorosilane hydrolysis product or hydroxyl-terminated polydimethylsiloxanes with a trimethylsilyl-terminated polydimethylsiloxane and a compound selected from a silane having at least three hydrolyzable groups, such as tetraethoxysilane, methyltrimethoxysilane or methyltriacetoxysilane, or a silicone resin which is substantially composed of $(CH_3)_3SiO_{1/2}$ and $SiO_2$ units in the ratio of from 2:1 to 1:2, in the presence of a catalyst.

A further variant for the preparation of branched viscoelastic polyorganosiloxanes is the reaction of an organosiloxane $X^1$ having randomly distributed, on average less than 2 functional groups per molecule with an organosiloxane $X^2$ having randomly distributed, on average more than 2 functional groups per molecule, in each case only one type of functional groups being present per siloxane $X^1$ or $X^2$, in the presence of a hydrosilylation-promoting catalyst, such as, for example, platinum or platinum compounds.

Furthermore, the antifoam agent based on siloxanes may contain from 0.1 to 10% by weight, preferably from 0.5 to 5% by weight, of at least one polyorganosiloxane (ab') of the general formula (II), in which $R^7$ is a methyl radical and $R^8$ is a linear and/or branched hydrocarbon radical having at least 6 carbon atoms, d assumes a value of from 0.005 to 0.5 and the sum (d+e) assumes a value of from 1.9 to 2.1. Such products are obtainable, for example, by alkali-catalyzed condensation of silanol-terminated polydimethylsiloxanes having a viscosity of from 50 to 50,000 mPa·s at 25° C. and aliphatic alcohols having more than 6 carbon atoms, such as isotridecyl alcohol, n-octanol, stearyl alcohol, 4-ethylhexadecanol, or eicosanol.

In the antifoam formulations, further known additives or auxiliaries may be present, for example further fillers, such as alumina, metal soaps, quartz powder which has been rendered hydrophobic or finely divided hydrophobic polyurethanes. The addition of substances acting as antifoam oils, such as mineral oils, liquid paraffins, fatty esters, fatty alcohols and waxes, in amounts of from 1 to 99% by weight, based on the total weight of the formulation, is also possible. Furthermore, known compounds, such as polyacrylic acid, polyacrylates, cellulose ethers such as carboxymethylcellulose and hydroxyethylcellulose, natural gums such as xanthan gum, and polyurethanes, may be added as thickeners.

The antifoam formulation can be prepared by known processes, for example with the use of high shear forces in colloid mills or rotor-stator homogenizers. The mixing process can be effected under reduced pressure in order to prevent mixing in of air which is contained in finely divided fillers.

The use of the antifoam formulations in oil-in-water emulsions (O/W emulsions) is preferred. The special polyether/polysiloxane copolymers used in the antifoam formulations have surfactant properties and are therefore also suitable as emulsifiers for the formation of oil-in-water emulsions, starting from antifoam agents based on siloxanes. Additional organic emulsifiers which can form O/W emulsions based on siloxanes may also be added to the antifoam formulations if they are used as emulsions.

The polysiloxane/polyether copolymers (B) can be emulsified together with the antifoam agent (A), or the polysiloxoane/polyether copolymers (B) can, however, also simply be added directly or in the form of an emulsion to the antifoam emulsion after the preparation of an emulsion of the antifoam agent (A), in order to achieve an improvement in the activity.

The antifoam formulations according to the invention, in the form of O/W emulsions, preferably comprise:
(A) from 5 to 50% by weight of antifoam agent based on siloxanes,
(B) from 0.1 to 30% by weight of polyether/polysiloxane copolymer(s) of the general formula (I),
(C) from 2 to 20% by weight of emulsifier, and
(D) from 50 to 95% by weight of water, based in each case on the total weight of the antifoam formulations, and optionally
(E) preservatives, thickeners and further additives.

The emulsifiers required for the preparation of the emulsions may be anionic, cationic or nonionic and are known to a person skilled in the art for the preparation of stable silicone emulsions. Emulsifier mixtures are preferably used, and at least one nonionic emulsifier, such as, for example, sorbitan fatty esters, ethoxylated sorbitan fatty esters, ethoxylated fatty acids, ethoxylated linear or branched alcohols having 10 to 20 carbon atoms and/or glyceryl esters, should preferably be present.

Technologies for the preparation of silicone emulsions are known. Usually, the preparation is effected by simply stirring all components and then homogenizing by means of rotor-stator homogenizers, colloid mills or high-pressure homogenizers.

The antifoam formulations according to the invention can be used wherever troublesome foam formation occurs in processes and is to be reduced or completely eliminated. These are, for example, use in detergents and cleaning agents, for controlling foam in wastewater treatment plants, in textile dyeing processes, in the scrubbing of natural gas, in dispersions and in hydrocarbons. In particular, the antifoam formulations according to the invention can be used in an outstanding manner for defoaming aqueous media obtained in pulp production.

WORKING EXAMPLES

All parts and percentages stated below are (unless stated otherwise) based on weight. The viscosities are based on 25° C.

(A) Preparation of the siloxane antifoams

A1: 94 parts of polydimethylsiloxane having a viscosity of 12,500 mm$^2$/s and 6 parts of a hydrophilic silica were homogenized three times using a colloid mill (0.6 mm gap). The silica was rendered hydrophobic in situ by heating the mixture to 190° C. for 10 hours.

A2: 400 parts of a hydroxyl-terminated polydimethylsiloxane having a viscosity of 65 mm$^2$/s, 40 parts of trimethylsilyloxy-terminated polydimethylsiloxane having a viscosity of 40 mm$^2$/s, 4 parts of methyltrimethoxysilane and 1 part of a 0.5% strength phosphonitrile chloride catalyst were heated to 100° C. In the course of 20 minutes, the pressure was reduced to 35 mbar. Neutralization of the catalyst was then effected with 0.03 part of triisooctylamine. The polyorganosiloxane obtained had a viscosity of 19,000 mm$^2$/s. 5 parts of a pretreated hydrophobic silica were incorporated into 95 parts of this oil and homogenized using a colloid mill.

A3: A mixture of 89.3 parts of a trimethylsilyloxy-terminated polydimethylsiloxane having a viscosity of 5,000 mm$^2$/s, 5 parts of a pyrogenic hydrophilic silica having a BET surface area of 300 m$^2$/g, 0.7 part of a 20% strength methanolic KOH, 2.5 parts of a silicone resin comprising 40 mol % of trimethylsilyloxy units and 60 mol % of $SiO_{4/2}$ units and 2.5 parts of a siloxane which was prepared by condensation of eicosanol with a hydroxyl-terminated polydimethylsiloxane having a viscosity of 65 mm$^2$/s were heated to 150° C. for 2 h. After cooling, the mixture was homogenized using a colloid mill.

(B) Preparation of the Polyether/Polysiloxane Copolymers

Preparation of the branched polyether/polysiloxane copolymer(polymer 1):

In a glass flask having a mechanical stirrer, 108 g of 1,2,4-trivinylcyclohexane are mixed with 1840 g of an α,ω-dihydrogenpolydimethylsiloxane containing 0.18% by weight of active hydrogen (Si-bound hydrogen) and having a viscosity of 9 mPa·s at 25° C., and then 1.9 g of a solution of a platinum-1,3-divinyl-1,1,3,3-tetramethyldisiloxane complex in dimethylpolysiloxane ("Karstedt catalyst") having a Pt content of 1.0% by weight were added. The reaction mixture warms up to about 80° C. in a few minutes and is stirred for about 1 hour at this temperature. A branched siloxane polymer having a viscosity of 220 mm$^2$/s at 25° C. and containing 0.067% by weight of active hydrogen (Si-bound hydrogen) is obtained. In accordance with the principle of synthesis, free siloxane chain ends consist of the highly reactive hydrogendimethylsilyloxy units.

100 g of this hydrogensiloxane polymer are metered into a mixture of 226 g of a monoallylic polyether having on average 24 ethyleneoxy and 25 propyleneoxy groups of the formula

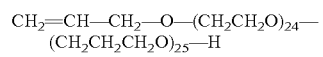

and 0.3 g of the Karstedt catalyst solution described above (Pt content=1.0% by weight), the mixture maintained at 100° C. After a total reaction time of 3 hours, the active hydrogen (Si-bound hydrogen) has completely reacted. After cooling to 25° C., a clear, very viscous product of 18,400 mPa·s at 25° C. is obtained. The free chain ends are modified with linear polyether chains.

Comparative Experiment (Polymer 2):

A commercial straight-chain polyether/polysiloxane copolymer having a viscosity of 800 mPa·s at 25° C. and a turbidity point of 30° C. was used as polymer 2.

Comparative Experiment (Polymer 3) According to EP-A 1 076 073:

A polymer corresponding to example B3 from EP-A 1 076 073 was used as polymer 3.

(C) Preparation and Testing of the Antifoam Formulations

Testing of the efficiency (black liquor test):

400 ml of black liquor (hardwood, from the processing of birch) were thermostated at 80° C. in a 1 l measuring cylinder with a wash bottle attachment for 15 minutes. After the addition of 10 mg of organosilicon polymers (the sum of silicone antifoam A and polyether/polysiloxane copolymer B) in the form of the prepared antifoam formulation, the black liquor was circulated by pumping at a rate of 2.3 l/min and, whenever (3 times altogether) a foam height of 30 cm had been reached in the measuring cylinder, 5 mg of silicone were immediately added (25 mg of silicone altogether). The time t between the beginning of the test and the time after the last addition when the foam had risen to 30 cm again was measured. The longer this period t, the more efficient is the antifoam.

Examples 1 to 3 (C11, C12, C13) and Comparative Experiments 1 and 2 (CV11 and CV12)

The preparation of the inventive antifoam formulations C11, C12, C13 and of the comparative antifoam formulations CV11 and CV12 were effected by simple mixing of 90 parts of the silicone antifoam stated in the table and 10 parts of the polyether/polysiloxane copolymer stated in the table using a laboratory dissolver. For the test, a mixture of 20 parts of this antifoam formulation and 80 parts of a mixture of aliphatic hydrocarbons having a viscosity of 3 mm²/s and a flashpoint >100° C. was prepared using a laboratory dissolver at 1000 min⁻¹. The results of the testing of the efficiency are summarized in the table.

Examples 4 to 6 (C21, C22 and C23) and Comparative Experiments 3 to 5 (CV21, CV22 and CV23)

For the preparation of the inventive antifoam formulations C21, C22 and C23 and of the comparative antifoam formulations CV21, CV22 and CV23, 20 parts of the silicone antifoam stated in the table, 5 parts of sorbitan monostearate, 5 parts of polyoxyethylene(40) stearate and 5 parts of the polyether/polysiloxane copolymer stated in the table were mixed at 70° C. 10 parts of a 1% strength solution of xanthan gum, preserved with 0.5% of formaldehyde, were stirred in using a blade stirrer at 600 min⁻¹. In the course of 3 minutes, 55 parts of water were added in portions and stirring was continued for 15 min at 1000 min⁻¹. The results of the testing of the efficiency are summarized in the table.

Examples 7 to 9 (C31, C32 and C33) and Comparative Experiments 6 and 7 (CV31 and CV32)

For the preparation of the inventive antifoam formulations C3 1, C32 and C33 and of the comparative antifoam formulations CV31 and CV32, 20 parts of the siloxane antifoam stated in the table, 4 parts of polyoxyethylene(4) stearate and 2 parts of the polyoxyethylene(40) stearate were mixed at 70° C. In the course of 10 minutes, 69 parts of water were added in portions. Finally, 5 parts of the polyether/polysiloxane copolymer stated in the table were added to the emulsion obtained and stirring was continued for 15 minutes at 1000 min⁻¹. The results of the testing of the efficiency are summarized in the table.

TABLE

Formulation and test results of the antifoam formulations

| Example or Comparative Example | Silicone antifoam | Polyether/polysiloxane copolymer | Black liquor test, t in s |
|---|---|---|---|
| C11 | A1 | Polymer 1 | 3580 |
| C12 | A2 | Polymer 1 | 4670 |
| C13 | A3 | Polymer 1 | 5240 |
| CV11 not acc. to the invention | A3 | Polymer 2 | 450 |
| CV12 not acc. to the invention | A3 | Polymer 3 | 1560 |
| C21 | A1 | Polymer 1 | 3280 |
| C22 | A2 | Polymer 1 | 4900 |
| C23 | A3 | Polymer 1 | 6350 |
| CV21 not acc. to the invention | A1 | None | 410 |
| CV22 not acc. to the invention | A1 | Polymer 2 | 590 |
| CV23 not acc. to the invention | A1 | Polymer 3 | 720 |
| C31 | A1 | Polymer 1 | 4080 |
| C32 | A2 | Polymer 1 | 5030 |
| C33 | A3 | Polymer 1 | 5980 |
| CV31 not acc. to the invention | A3 | None | 540 |
| CV32 not acc. to the invention | A3 | Polymer 3 | 2110 |

The substantially improved efficiency of the antifoam formulations according to the invention compared with the prior art (comparative experiments) is evident from the substantially higher values for t.

Repetition of the antifoam testing in a softwood black liquor (pine) confirmed the outstanding efficiency of the inventive antifoam formulations.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An antifoam formulation comprising:
   (A) at least one siloxane antifoam based on siloxane composition, and
   (B) at least one branched polyether/polysiloxane copolymer comprising structural elements of the formula $$Y[-C_nH_{2n}-(R_2SiO)_m-A_p-R_2Si-G]_x \quad (I)$$

in which
   Y is a trivalent to decavalent, hydrocarbon radical optionally containing one or more hetero atoms selected from the group consisting of the oxygen, nitrogen and silicon,
   R are identical or different monovalent, optionally halogenated hydrocarbon radicals having 1 to 18 carbon atoms per radical,
   A is a radical of the formula $-R_2Si-R_2-(R_2SiO)_m-$, in which $R^2$ is a divalent hydrocarbon radical which has 2 to 30 carbon atoms and may be interrupted by one or more non-adjacent oxygen atoms,
   G is a monovalent radical of the formula $-C_fH_{2f-2k}-Z$, or a divalent radical of the formula $-C_nH_{2n}-$ in which the second bond is to a further radical Y,
   Z is a radical of the formula $$-(R^6)_v-(OCH_2CH_2)_a[OCH_2CH(CH_3)]_b[OCH_2CH(CH_2CH_3)]_c-OR^3,$$

in which $R^3$ is a hydrogen atom, a hydrocarbon radical having 1 to 18 carbon atoms, or a radical of the formula $R-C(O)-$,
   $R^6$ is a divalent hydrocarbon radical having 1 to 10 carbon atoms, v is 0 or 1,
   a, b and c are 0 or an integer between 1 and 1000, with the proviso that the sum (a+b+c) has a value of from 2 to 2000,
   x is an integer from 3 to 10,
   f is an integer from 2 to 12, k is 0 or 1, n is an integer from 2 to 12, m is an integer of at least 1, and p is 0 or a positive integer, with the proviso that the branched polyether/polysiloxane copolymers (B) contain on average at least one group Z.

2. The antifoam formulation of claim 1, wherein Y is a trivalent or a tetravalent hydrocarbon radical.

3. The antifoam formulation of claim 2, which contains from 0.1 to 50% by weight of polyether/polysiloxane copolymers (B).

4. The antifoam formulation of claim 1, wherein the branched polyether/polysiloxane copolymers (B) are prepared by a procedure in which, in a first step, compounds (1) having at least three aliphatic double bonds and of the formula

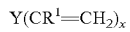

in which $R^1$ is a hydrogen atom or an alkyl radical having 1 to 10 carbon atoms, are reacted with organopolysiloxanes (2) of the general formula

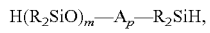

in the presence of a catalyst (3) promoting the addition of Si-bound hydrogen at an aliphatic multiple bond, and in a second step, the branched intermediates (5) thus obtained and having Si-bound hydrogen atoms are reacted with organic compounds (4) of the formula

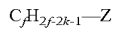

selected from the group consisting of if k=0: $H_2C=CR^4$—Z (4a) and if k=1: $R^5C=C$—Z (4b)

in which $R^4$ and $R^5$ have the meaning of $R^1$, in the presence of catalysts (3) promoting the addition of Si-bound hydrogen and an aliphatic multiple bond.

5. The antifoam formulation of claim 4, which contains from 0.1 to 50% by weight of polyether/polysiloxane copolymers (B).

6. The antifoam formulation of claim 1, which contains from 0.1 to 50% by weight of polyether/polysiloxane copolymers (B).

7. The antifoam formulation of claim 1, wherein the polyether/polysiloxane copolymers (B) are those in which Y is a radical of the formula

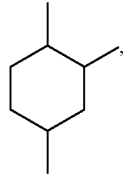

n is 2, p is 0 and x is 3.

8. The antifoam formulation of claim 1, wherein the polyether/polysiloxane copolymer(s) (B) include at least one in which f is 2, k is 0, v is 1, c is 0, and $R^6$ is a radical of the formula —$CH_2$—.

9. The antifoam formulation of claim 1, wherein, in at least one polyether/polysiloxane copolymer (B), the ratio of terminal groups Z to branching groups Y is from 1.0 to 2.0.

10. The antifoam formulation of claim 1, which comprise:

(A) from 1 to 90% by weight of siloxane antifoam composition, (B) from 0.1 to 50% by weight of branched polyether/polysiloxane copolymer(s) of the general formula (I), (C) from 0 to 20% by weight of emulsifiers, (D) from 0 to 97% by weight of water, the weight percentages based on the total weight of the antifoam formulation.

11. The antifoam formulation of claim 1, which are emulsions comprising (A) from 5 to 50% by weight of siloxane antifoam composition, (B) from 0.1 to 30% by weight of at least one polyether/polysiloxane copolymer of the general formula (I), (C) from 2 to 20% by weight of an emulsifier, (D) from 50 to 95% by weight of water, the weight percentages based on the total weight of the antifoam formulation.

12. The antifoam formulation of claim 1, wherein a mixture of silica and polyorganosiloxanes is used as the siloxane antifoam composition.

13. The antifoam formulation of claim 1, wherein the polysiloxane/polyether copolymer(s) (B) are emulsified together with the antifoam (A), or the polysiloxane/polyether copolymers (B) are added to an antifoam emulsion directly or in the form of an emulsion.

14. In a process for defoaming aqueous media in pulp production where an antifoam is added to said media, the improvement comprising selecting as said antifoam the antifoam formulation of claim 1.

* * * * *

UNITED STATES PATENT AND TRADEMARK OFFICE
CERTIFICATE OF CORRECTION

PATENT NO. : 7,105,581 B2 Page 1 of 1
APPLICATION NO. : 10/703940
DATED : September 12, 2006
INVENTOR(S) : Willibald Burger et al.

It is certified that error appears in the above-identified patent and that said Letters Patent is hereby corrected as shown below:

Column 14, Line 47, Claim 1:

Delete "$R_2Si-R_2$" and insert therefor -- $R_2SiR^2$ --.

Signed and Sealed this

Second Day of January, 2007

JON W. DUDAS
*Director of the United States Patent and Trademark Office*